COLOR TELEVISION CONTROL APPARATUS

Filed Sept. 11, 1951 3 Sheets-Sheet 1

INVENTOR
Stuart W. Seeley
BY
ATTORNEY

May 26, 1964 S. W. SEELEY 3,134,850

COLOR TELEVISION CONTROL APPARATUS

Filed Sept. 11, 1951 3 Sheets–Sheet 2

INVENTOR
Stuart W. Seeley
BY
ATTORNEY

May 26, 1964 S. W. SEELEY 3,134,850

COLOR TELEVISION CONTROL APPARATUS

Filed Sept. 11, 1951 3 Sheets-Sheet 3

INVENTOR
Stuart W. Seeley
BY
[signature]
ATTORNEY

United States Patent Office 3,134,850 Patented May 26, 1964

3,134,850

COLOR TELEVISION CONTROL APPARATUS

Stuart W. Seeley, Roslyn Heights, N.Y., assignor to Radio Corporation of America, a corporation of Delaware Filed Sept. 11, 1951, Ser. No. 246,052
13 Claims. (Cl. 178—5.4)

This invention relates to color television systems and more particularly to apparatus for use in that type of system in which a carrier wave is modulated in phase and amplitude to represent the color of a subject.

In a color television system operating in accordance with the well-known multiplex principle, the video signals representing the total brightness of a subject are transmitted substantially in the usual manner for black and white video signals. In such a color television system it also is necessary that a predetermined frequency range of video signals representing the color of the different elemental areas of the subject be transmitted. Both of these brightness- and color-representative video signal components are transmitted in the same channel having a fixed frequency band. Such transmission is effected by the multiplexing process. In carrying out such a process, there is produced a phase- and amplitude-modulated color carrier wave having a nominal frequency within the frequency pass bond of the channel. This color carrier wave is modulated both in phase and in amplitude to represent the color of the subject.

In order that the phase and amplitude of the color carrier wave, representing the hue and saturation respectively of the subject, may be properly utilized to correctly reproduce the color of the subject, it heretofore has been necessary to employ selective filters, or other equivalent circuit means, in conjunction with the color-representative signal-transfer apparatus then used. Such frequency selective means must be responsive only to the color carrier wave and its modulation side bands and at the same time be substantially unresponsive to the total brightness representative video signals in the frequency band of the color representative signals.

It is an object of the present invention, therefore, to provide improved signal-transfer apparatus for use in conjunction with a phase- and amplitude-modulated color carrier wave in a color television system, whereby to obviate the use of frequency selective apparatus.

Another object of the invention is to provide improved signal-transfer apparatus for an image-reproducing system of such a character to produce in its output circuit only those signal potentials representing the colors in which the image is to be reproduced.

A further object of the invention is to provide improved signal-transfer apparatus for use in conjunction with a phase- and amplitude-modulated color carrier wave in which apparatus variations, such as non-uniformity of electron tubes, are ineffective to produce significant variations in the signal effects in the output circuit thereof.

Still another object of the invention is to provide improved signal-transfer apparatus for use in conjunction with a phase- and amplitude-modulated color carrier wave in a color television system of such a character that it is unnecessary to filter or otherwise remove the direct current and/or relatively low frequency components of the video signal.

In accordance with this invention, there is provided signal transfer apparatus which includes a source of substantially constant current and a plurality of substantially similar circuits coupled to the constant current source. The current from the source is divided among these circuits in accordance with the respective circuit impedances. In order that the current division may be varied in accordance with color variations of the subject, a variable impedance device is included in each of the current dividing circuits. A convenient form of variable impedance which may be employed in the present invention is an electron tube of the type having at least an anode, a cathode and a control grid. The anode-to-cathode paths of the tubes are connected to the constant current source so that the impedance of each current-dividing circuit may be varied by signals impressed upon the control grid of the tube in that circuit. The color-representative video signals are impressed upon control elements of respective impedance devices which, in the case of electron tubes, are the control grids so as to vary the impedances of these devices substantially simultaneously in accordance with the magnitude of the respective color-representative video signals. By such means there are developed in the respective current-dividing circuits signal effects which correspond to the relative values of the subject colors as represented by the video signals independently of any brightness information included in the color-representative signals. In one practical embodiment of the invention, the constant current source includes a relatively high impedance circuit connected in common to the cathodes of the electron tubes in the respective current-dividing circuits.

In one type of color television system in which signal-transfer apparatus in accordance with the present invention may be embodied, a color carrier wave is modulated both in phase and in amplitude in accordance with video signals representing the different colors of the subject. This carrier wave is impressed upon a space current control electrode of each of the electron tubes forming the variable impedance devices in the respective current-dividing circuits. Also, there is impressed upon the same, or other, space current control grids of these tubes a reference frequency wave having a frequency equal to the color carrier wave frequency.

In one form of the invention, both the video signal-modulated carrier wave and the reference frequency wave are impressed upon the control grids of a plurality of triodes forming the variable impedance devices. In this case, appropriate phase delay of both the color carrier and the reference frequency waves are effected by means of a common delay apparatus. In this case, the carrier wave and the reference frequency wave are impressed upon the same control grids of the variable impedance electron tubes. Hence, these tubes may be triodes.

In another form of the invention, the entire video signal, including the total brightness component and the phase- and amplitude-modulated color carrier, is impressed upon corresponding grids of three electron tubes and a reference frequency, equal to the color carrier frequency, is impressed upon other corresponding grids of the same electron tubes. In this embodiment of the invention the grids which receive the video signal are coupled to successive points on a delay line having predetermined phase delays at the color carrier frequency between tap points. The reference frequency is applied to all three tubes in like fixed phase.

In accordance with another feature of the invention, the respective anode circuits of the variable impedance electron tubes employed in the signal-transfer apparatus may be provided with additional facilities by which to insure that only the desired color-representative signal effects are produced. Inasmuch as the information which it is desired to reproduce by such apparatus comprises a plurality of output voltages, or currents, representing the relative amounts of the primary colors of the subject, it is desirable to exclude the color carrier wave as well as video signal components representing total subject brightness from the output circuits of the tubes. Accordingly, the load circuits in the plates of the tubes may be provided with well known shunt and/or series trap components so that their output frequency characteristic falls off in the region of the color carrier frequency. Since the brightness information of the video signals is rendered ineffective by means of the substantially constant current source comprising the degenerative cathode circuits of the tubes, it will be seen that the apparatus produces the desired signal effects.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figure 1:
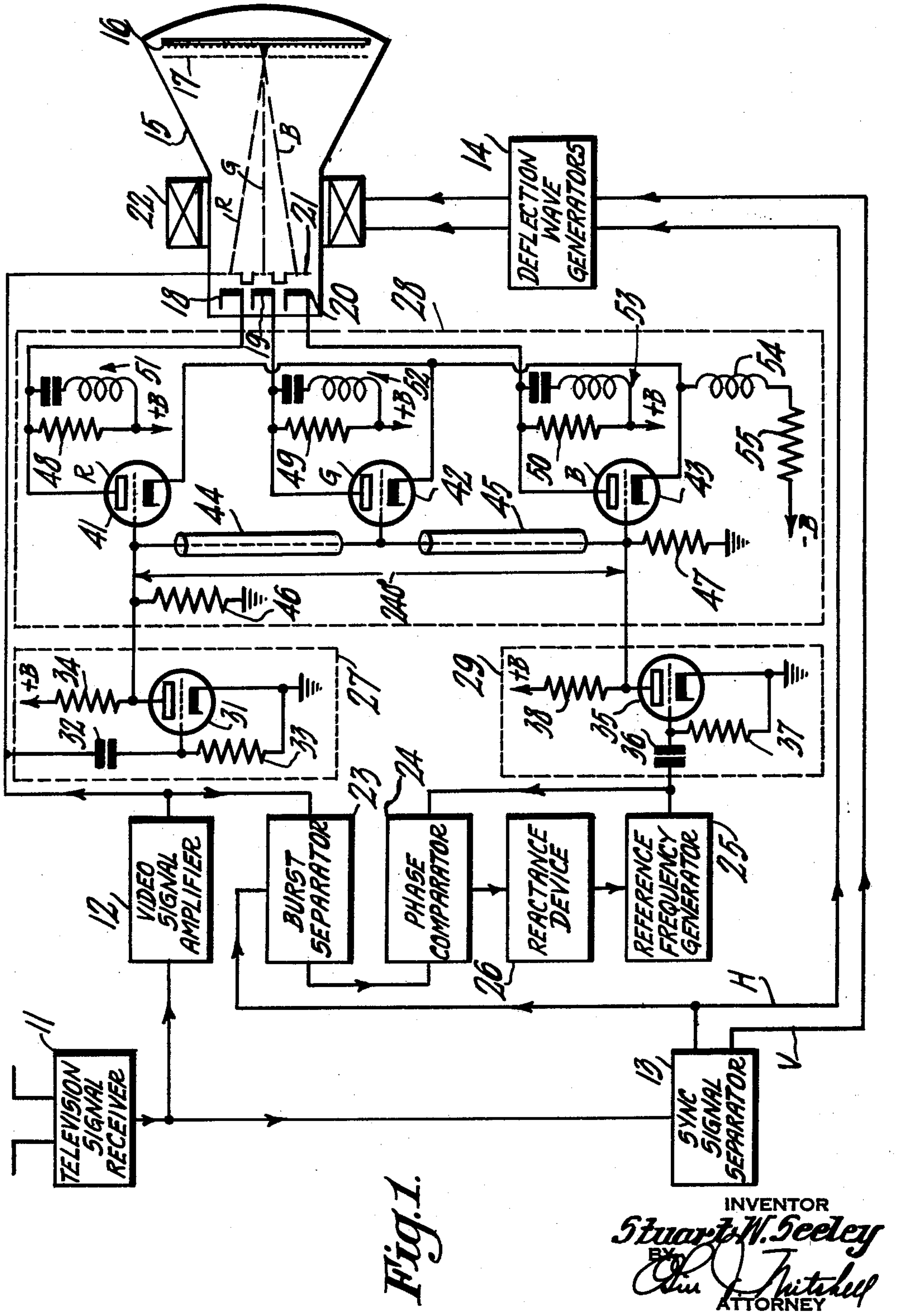
FIGURE 1 is a circuit diagram, mostly in block form, of a color television signal-receiving and image-reproducing system embodying one form of the present invention.

There will first be given a general description of the type of color television apparatus with which the invention is particularly useful. It is assumed that the invention is embodied in a three-color television system operating in accordance with the multiplex principle as disclosed in an article, titled "A Six-Megacycle Compatible High-Definition Color Television System," by RCA Laboratories Division, which was published in the RCA Review, December 1949, volume X, No. 4, at page 504. Such a system also forms the subject matter of a copending U.S. application of John Evans, Ser. No. 111,384, filed August 20, 1949, now Patent No. 2,810,781, issued October 22, 1957, and titled "Color Television Transmitter." In such a system, the video signals that are generated, transmitted and received represent each of the three primary colors of a multiplicity of successive elemental areas of the subject of which an image is to be reproduced. The rate at which the video signals representing each of the different image colors are repeated is designated at the color sampling, or reference, frequency. In the present system for example, the frequency is that of a color carrier wave which is modulated in phase to represent the hue of the subject color and in amplitude to represent the color saturation as previously indicated. Such a color-modulated carrier wave is transmitted as a sub-carrier wave within the same channel with a total brightness signal which is represented as an amplitude modulation of the radiated carrier wave.

Composite video signals of the character generally referred to are described in greater detail in the article, titled "A Six-Megacycle Compatible High-Definition Color Television System," previously referred to. Also, a similar discussion is given in a paper, titled "Mixed Highs in Color Television," by Alda V. Bedford, published in the Proceedings of the IRE, September 1950 in volume 38, pages 1003 to 1009. Signals of this character also comprise the subject matter of a copending application of Alda V. Bedford, Serial No. 714,750, filed December 7, 1946, now Patent No. 2,554,693 issued May 29, 1951, and titled "Simultaneous Multi-Color Television."

For present illustrative purposes, it will be assumed that the invention is embodied in a color television image-reproducing system of the type shown in FIGURE 1, to which reference now will be made. However, it will be understood that the same principles may be utilized also in a color television video signal-generating and transmitting system. The carrier wave is received and impressed upon a television signal receiver 11. It will be understood that this apparatus may be entirely conventional equipment such as found in present black and white television receivers. Briefly, it comprises carrier wave-amplifying apparatus, a frequency converter and a signal detector by means of which the video and system control signals, such as the synchronizing pulses, are recovered from the radiated carrier wave. Accordingly, it will be understood that the output circuits of the receiver 11 may be coupled in a conventional manner to a video signal amplifier 12 and to a sync signal separator 13.

The video signal amplifier functions to amplify the complete video signal including the brightness component and the color component represented by the phase- and amplitude-modulated color carrier wave. The sync signal separator also functions in the usual way to separate the horizontal and vertical synchronizing pulses from the video signals and also from one another. The separated horizontal and vertical synchronizing pulses are impressed by circuits "H" and "V" respectively upon deflection wave generator apparatus 14. This apparatus also functions in the usual manner to produce sawtooth wave energy at both the horizontal and vertical deflection frequencies for control of the electron beam deflection in an image-reproducing device.

In the present case, the image-reproducing device is a tri-color kinescope 15. It will be understood that the particular details of the image-reproducing apparatus are relatively immaterial so far as the present invention is concerned. The form of kinescope 15 which is illustrated here is substantially of the same type as disclosed in a copending U.S. patent application of Alfred C. Schroeder, Ser. No. 730,637, filed February 24, 1947, now Patent No. 2,595,548 issued May 6, 1952 and titled "Picture Reproducing Apparatus."

Essentially, such a kinescope includes a luminescent screen 16 formed of a multiplicity of small phosphor dots, each of sub-elemental dimensions and arranged in groups and having such properties as to be respectively capable of reproducing the image colors when excited by an electron beam. This type of kinescope also is provided with an apertured masking electrode 17 which is located behind the luminescent screen and is provided with apertures for, and in alignment with, the respective groups of phosphor dots. A plurality of electron beams, or as in another specific embodiment of such a tube, different components of a single beam are directed through the apertures of the mask 17 from different directions, thereby striking different phosphors capable of producing the different image colors.

In the present case, these differently directed beams are derived from three separate electron guns having respective cathodes 18, 19 and 20. The control grids associated with the cathodes of the different electron guns are all connected together electrically. Accordingly, in the diagrammatic showing of the drawing, the electron beam intensity control may be considered as effected by a grid electrode 21 common to all of the electron guns. Deflection of all three of the beams is effected by means of a common deflection yoke 22 which is energized by the substantially sawtooth waves at the horizontal and vertical deflection frequencies as derived from the deflection wave generators 14.

It will be understood that the invention is not necessarily limited for use in conjunction with any particular type of image-reproducing apparatus. Other types of multicolor kinescopes such as the kind having a plurality of electron guns and a directional luminescent screen may be used. Illustrative of such a type of kinescope is that disclosed in U.S. Patent 2,481,839, granted September 13, 1949, to Alfred N. Goldsmith for "Color Television." Also, it will be appreciated that a plurality of kinescopes, one for each color, may be used in such an arrangement that individual color images are combined optically for projection onto a viewing screen or for direct viewing. Typical arrangements of this sort are disclosed respectively in bulletins, titled "A 15 by 20-Inch Projection Receiver for the RCA Color Television System" and "A Three-Color Direct-View Receiver for the RCA Color System," published, respectively, in October 1949 and January 1950 by Radio Corporation of Ameria.

In order that the receiving apparatus such as shown in the drawing be capable of operating synchronously with the associated transmitting apparatus, not only for the deflection of the electron beams of the kinescope 15 to scan the usual raster, but also with respect to the phase demodulation of the received color carrier wave, there is transmitted as part of the conventional composite television signal, an energy burst consisting of several cycles at the color carrier wave frequency. This burst of frequency is transmitted during the blanking intervals and immediately following the horizontal synchronizing pulses. More complete disclosures of this and other types of synchronizing systems which may be used in the practice of the present invention may be found in a publication, titled "Recent Developments in Color Synchronization in the RCA Color Television System," issued February 1950 by Radio Corporation of America. FIGURE 9 of this publication refers particularly to the receiver apparatus. The burst type of color synchronizing signal also forms the subject matter of a copending U.S. application of Alda V. Bedford, Ser. No. 143,800, filed February 11, 1950, now Patent No. 2,728,812 issued December 27, 1955, and titled "Synchronizing Apparatus."

In accordance with the usual practice, this burst of the color carrier wave frequency is super-imposed upon the horizontal blanking pedestal in the so-called "back porch" region. Accordingly, the system embodying the present invention also includes a burst separator apparatus 23 which is coupled to the output circuit of the video signal amplifier 12. The burst separator is essentially a gating device. It is rendered operative only during the back porch intervals of the composite television signal under the control of horizontal synchronizing pulses derived from the sync signal separator 13. By means of such apparatus, controlled in the manner described, there is produced in its output circuit a short burst of energy having the frequency of the color carrier wave. This energy burst is impressed upon a phase comparator 24 which also receives a wave of substantially the same frequency from a reference frequency wave generator 25. Any phase difference between the separated energy burst and the wave from the generator 25 is detected by the phase comparator 24. Such a phase difference is a result of a deviation of the generator 25 from the frequency of the received color carrier wave. The output circuit of the phase comparator 24, in which there is developed a voltage representative of the magnitude and sense of any phase difference, is coupled to a reactance device 26 which in turn is coupled to the reference frequency generator 25 in the usual manner for controlling the frequency of the locally generated wave.

The composite video signal derived from the video signal amplifier 12, in addition to being impressed upon the common control grid 21 for the three electron guns of the color kinescope 15, also is impressed upon a common video signal driving stage 27. The output of the driving stage is coupled to one input circuit of a signal-transfer apparatus 28 embodying the present invention. The reference frequency wave derived from the generator 25 is impressed upon a reference frequency wave driving stage 29 having its output circuit coupled to another input circuit of the balanced signal-transfer apparatus 28. This apparatus also has three similar output circuits coupled respectively to the cathodes 18, 19 and 20 of the color kinescope 15.

The video signal driving stage 27 includes an electron tube 31 having an input circuit, including a coupling capacitor 32 and a grid resistor 33, coupled between the video signal amplifier 12 and the control grid of the tube. The output circuit of the driving tube 31 includes a load resistor 34 connected between the anode of the tube and a suitable source of space current indicated at +B. Similarly, the reference frequency wave driving stage 29 includes an electron tube 35 provided with an input circuit including a coupling capacitor 36 and a grid resistor 37 and an output circuit including a load resistor 38.

The signal-transfer apparatus 28 embodying the invention comprises a demodulator for the composite color representative video signals. Accordingly, there is provided an electron tube for each of the color-representative video signals to be demodulated. In the assumed case of a three-color television system, the present demodulator includes electron tubes 41, 42 and 43 to demodulate the red, green and blue color-representative video signals, respectively. In this form of the invention, the demodulator tubes may be triodes as shown.

In order that the different color-representative video signals may be impressed in the desired phase relationships upon the respective control grids of the tube 41, 42 and 43 and also in order that the reference frequency wave may be impressed upon the grids of these tubes in suitable phase to coincide with the respective color-representative video signal components of the phase-modulated color carrier wave, there is employed in this form of the invention, delay apparatus which is diagrammatically represented as a pair of delay lines 44 and 45 connected in series substantially as shown. The terminals of the series-connected delay lines are connected respectively to the grids of the red and blue demodulator tubes 41 and 43 and the intermediate junction point between the delay lines is connected to the grid of the green demodulator tube 42. The phase delay apparatus is suitably terminated by resistors 46 and 47.

It will be understood that the phase delay apparatus including the lines 44 and 45 is designed to operate in such a manner that the received color carrier wave representing the subject colors is impressed upon the grids of the demodulator tubes 41, 42 and 43 in such respective phases that the total current in these tubes at the carrier wave frequency is zero at all times. Accordingly, the components of the delay apparatus such as the lines 44 and 45 will be understood to be capable of producing whatever delays are required to effect this result in accordance with the particular phases of the color carrier wave which are employed. For example, if so-called symmetrical sampling is effected in the system embodying the invention, the delay lines 44 and 45 will be understood to be capable of producing phase delays each of substantially 120 electrical degrees at the sampling frequency. This is in accordance with the indication on the drawing that the combined phase delay is substantially equal to 240 degrees. It will be understood, however, that should unsymmetrical sampling be employed in the color television system the delay lines 44 and 45 may be suitably selected to operate in such a system. For the purpose of the present invention, however, it will be assumed that symmetrical sampling is employed and that for the purpose of clarity, it will be understood that the red-representative color carrier wave has zero phase, the green-representative color carrier wave has −120 degree phase and the blue-representative color carrier wave has —240 degree phase. Accordingly, it will be seen that the reference frequency wave derived from the generator 25 and having the same frequency as the received color carrier wave also will be impressed in the desired phase relationships upon the control grids of the demodulator tubes 41, 42 and 43.

Figure 2:
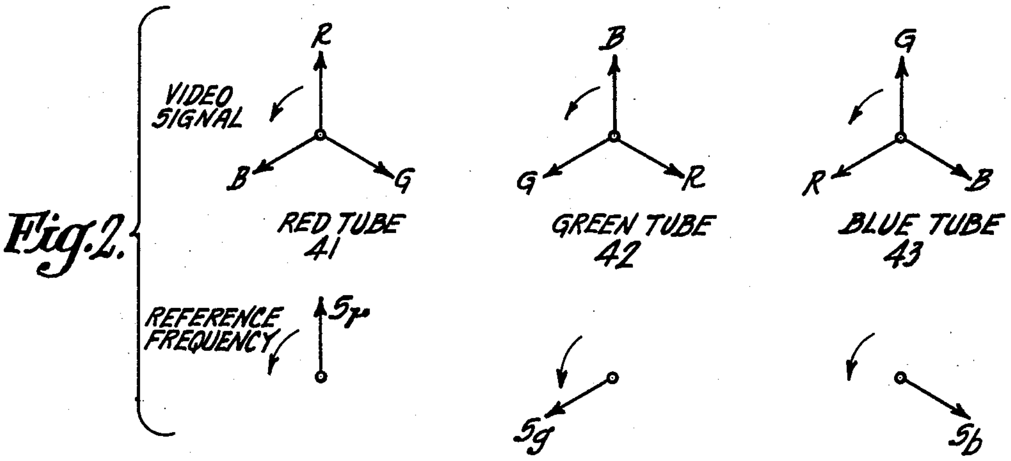
FIGURE 2 is a vector diagram for reference in connection with the explanation of the manner in which the apparatus of FIGURE 1 operates.

A clearer understanding of the manner in which the composite color-representative video signal-modulated color carrier wave and the reference frequency wave are impressed upon the demodulator tubes 41, 42 and 43 may be had by additional reference to FIGURE 2 of the drawings. The three-phase color carrier wave, as indicated by the vectors R, G and B, is impressed upon the red, green and blue demodulator tubes 41, 42 and 43 in such a manner that the wave which is impressed upon the green tube 42 lags the wave impressed upon the red tube 41 by 120 degrees. Similarly, these vectors indicate that the three-phase wave is impressed upon the blue tube 43 in a phase lagging by 120 degrees the phase of the wave impressed upon the green tube 42. As previously explained, these phase delays are produced by the apparatus including the delay lines 44 and 45.

Also, it may be seen from FIGURE 2 that the reference frequency wave represented by the vector $S_b$ is impressed upon the blue demodulator tube 43 in such phase that it coincides with the blue-representative phase of the video signal-modulated color carrier wave impressed upon this tube. Similarly, by reason of the delay line 45, it is seen from the position of the vector $S_g$, that the reference frequency wave is impressed upon the green demodulator tube 42 in a phase lagging by 120 degrees that in which the wave is impressed upon the blue tube 43. In this instance, it is seen that the reference frequency wave coincides in phase with the green-representative color carrier wave phase as impressed upon the tube 42. Likewise, a further 120 degree phase delay is effected by the line 44 for the impression of the reference frequency wave upon the red demodulator tube 41. It is seen, from the position of the vector $S_r$ relative to the color-representative vectors R, G and B, that the reference frequency wave component is in phase with the red-representative color carrier wave phase at the tube 41.

The synchronous demodulation of the sub-carrier wave by means of tubes 41, 42 and 43 is substantially similar to other forms of such apparatus previously employed in systems of the character described. Maximum current conductivity in the respective tubes is effected only in response to the phase coincidence in the impression of the reference frequency wave and the particular color-representative color carrier wave phase upon the input circuit of the tube. Consequently, it is seen that, in view of the explanation of the demodulator apparatus 28 with reference to the vector diagrams of FIGURE 2, there are produced in the respective output circuits of the tubes 41, 42 and 43 the red, green and blue representative video signals as desired.

The output circuits of the tubes 41, 42 and 43 include load resistors 48, 49 and 50, respectively, connected to suitable sources of space current designated at +B and to the anodes of the tubes. In addition to the desired color-representative signals produced in the output circuits of these tubes, there may also be produced a substantially sinusoidal current component at the reference or color carrier wave frequency. The effect of this component may be removed by suitable trap circuits such as the series arrangements of a capacitor and an inductor 51, 52 and 53 shunting the load resistors 48, 49, 50, respectively.

In the absence of the present invention, however, there would also be developed in the output circuits of the demodulator tubes 41, 42 and 43 undesired signal effects representing total or combined brightness information of the different colors of the subject, unless other steps, such as the use of frequency selective filters or the like, were taken to overcome them. In accordance with the usual multiplex practice, this brightness information would be for the lower frequency components of the subject. However, it is desired to impress the entire frequency range of brightness signals upon the intensity control grids 21 of the color kinescope 15. To additionally impress the low frequency brightness information upon the cathodes 18, 19 and 20 of the kinescope would be deleterious in the reproduction of images for the reason that the electron beams, in a sense, would be over-modulated for brightness in the low frequency region.

In accordance with the present invention, however, the cathodes of the demodulator tubes 41, 42 and 43 are connected together and through a common degenerative circuit which may include an inductor 54 and a resistor 55 to a point of fixed reference potential such as ground or, preferably as indicated in FIGURE 1, a more negative point such as represented at —B. The impedance of this circuit should be made as high as practicable. Generally, it is preferred that this circuit comprise suitable combinations of resistance and inductance devices connected suitably to maintain a relatively high impedance throughout the operating frequency range. By such means, the degenerative circuit may be made to have an impedance of several thousand ohms throughout a range of frequencies from zero to approximately 4.5 megacycles, despite normal heater-to-cathode and other capacitances associated with the cathodes of the three tubes.

It is seen that, by means of the described apparatus, the composite video signal representing such total brightness is impressed upon the intensity control grids 21 of the kinescope 15, say in positive polarity so that it tends to produce the same increase in the intensity of all of the electron beams. The same signal, after the described demodulation by the signal-transfer apparatus 28 is impressed in the opposite, or negative, polarity upon the kinescope cathodes 18, 19 and 20. Since the signal effects impressed upon the cathodes represent only the color information, independently of any brightness, it may be seen that the intensities of the respective electron beams are varied under the joint control of the brightness and color signals.

By means of the present invention, the total brightness signals, which are present in the composite video signal impressed upon the signal-transfer apparatus 28, are rendered ineffective so that they do not appear in the output circuit of the signal-transfer apparatus. The common cathode impedance tends to maintain the same proportionality in the output signals in spite of normal tolerance variations in conversion conductance of the three tubes. For example, a decrease in the conversion conductance of any one tube is offset by the tendency for the other two tubes to have any unbalanced signal component in their cathode circuits affect their conversion conductance in a like manner. Substantially the only factor which can materially change the potentials at the anodes of the tubes 41, 42 and 43 is the relative phase of the reference frequency wave and the color-representative video signals which are in the form of phase moduations of the received color carrier wave. Therefore, the average potential of the three tube anodes is maintained substantially constant. For example, if the anode of the tube 42 becomes more negative to represent an increase in the green hue of the image to be reproduced, the anodes of the tubes 41, and 43, at the same time, must become sufficiently less negative in order to maintain the proper balance among the potentials impressed upon the cathodes 18, 19 and 20 of the kinescope 15. These results are produced by the operation of the circuit arrangement employing the invention in the manner previously described. Thus, the three output potentials derived respectively from the tubes 41, 42 and 43 are direct functions of the relative values of the primary hues in which the image is to be reproduced. Since these potentials do not represent anything else such as the total brightness of the image, they do not tend to control the intensity of the electron beams of the kinescope either because of straight amplification of the video components or by non-linear detection of such components.

Figure 3:
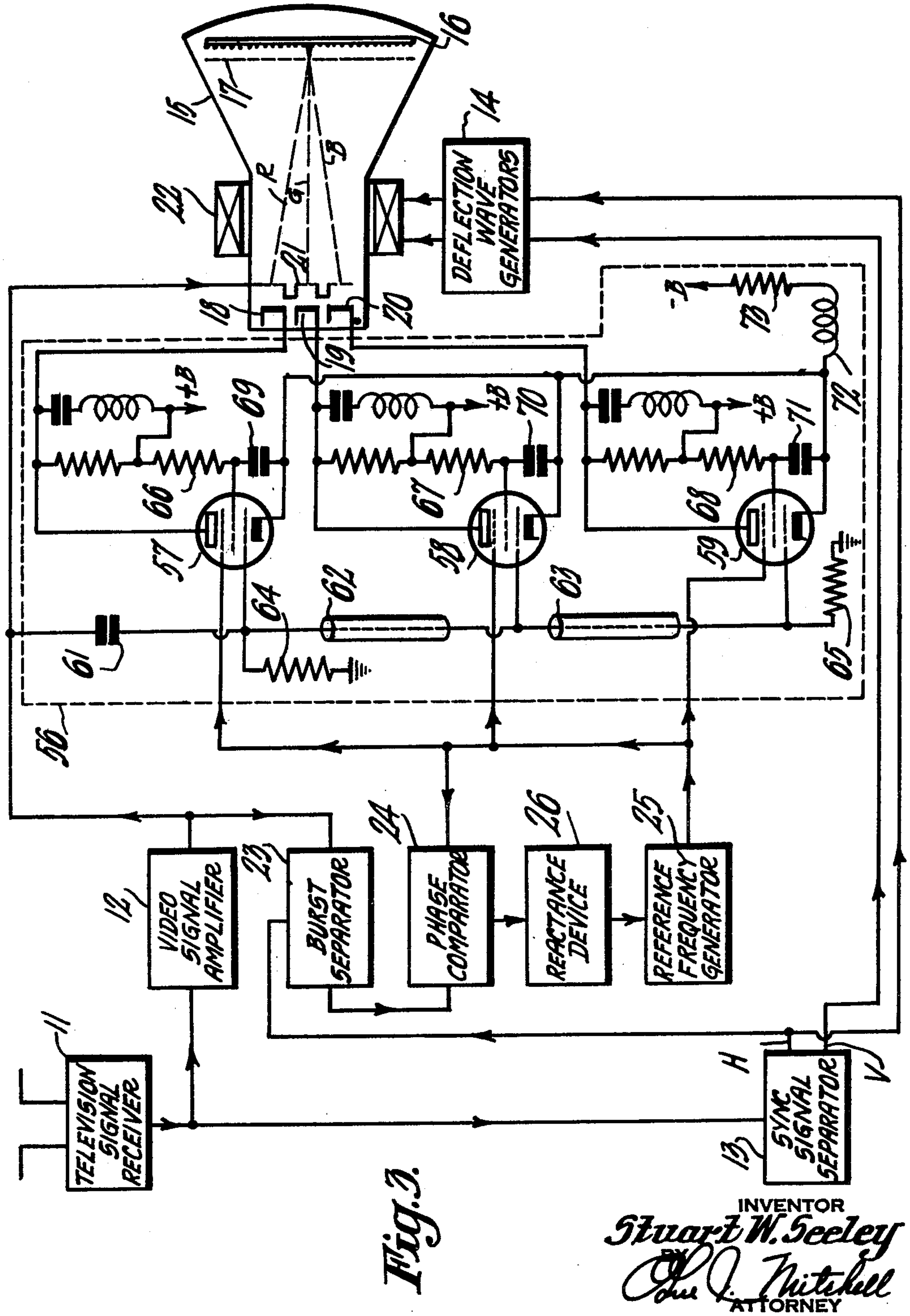
FIGURE 3 is a circuit diagram, mostly in block form, of another embodiment of signal transfer apparatus in accordance with this invention; and, FIGURE 4 is another vector diagram for use in explaining the manner in which the apparatus of FIGURE 3 operates.

Another, and in some respects, a more practical form of the invention is shown in FIGURE 3 to which reference now will be made. The signal-receiving and image-reproducing system is substantially the same as in the embodiment of the invention shown in FIGURE 1. In the present case, however, the signal-transfer apparatus 56 includes multi-grid tubes 57, 58 and 59 for demodulating the red, green and blue color-representative video signals, respectively. It will be understood that these tubes are of such a character that they have a plurality of grids which are capable of controlling the electron current flow between the respective cathodes and anodes. In the form illustrated, the first and third grids of the tubes are assumed to have this capability. The second grids of the tubes serve as screen grids.

The composite video signal derived from the video signal amplifier 12 is impressed by a coupling capacitor 61 and two phase delay devices 62 and 63 upon the No. 1 grids of the demodulator tubes 57, 58 and 59 respectively. It will be understood that the delay devices 62 and 63 are of the same general character as described previously in connection with the apparatus shown in FIGURE 1. By such means, it will be assumed that the composite video signal is impressed upon these tubes in such a way that the red, green and blue representative phases of the color carrier wave are impressed upon the tubes 57, 58 and 59, respectively. Resistors 64 and 65 are provided so as to properly terminate the delay devices 62 and 63 and also to provide suitable impedances in the No. 1 grid circuits of the demodulator tubes. The reference frequency wave derived from the generator 25 is impressed in the same phase upon the No. 3 grids of the demodulator tubes, substantally as shown.

The No. 2 or screen grids, of the tubes 57, 58 and 59, are energized at suitable positive potentials by means of circuits including resistors 66, 67 and 68, respectively, connecting them to sources of positive potentials such as indicated at +B. These grids also are bypassed to their associated cathodes by capacitors 69, 70 and 71 in a generally conventional manner. The anode circuits of the demodulator tubes include suitable load resistors and trap circuits for the reference frequency component similar to the arrangement of these circuits in the embodiment of the invention shown in FIGURE 1. Also, in accordance with the present invention, the cathodes of the demodulator tubes are connected together and through a degenerative circuit including an inductor 72 and a resistor 73 to a source of reference potential such as indicated at —B.

Figure 4:
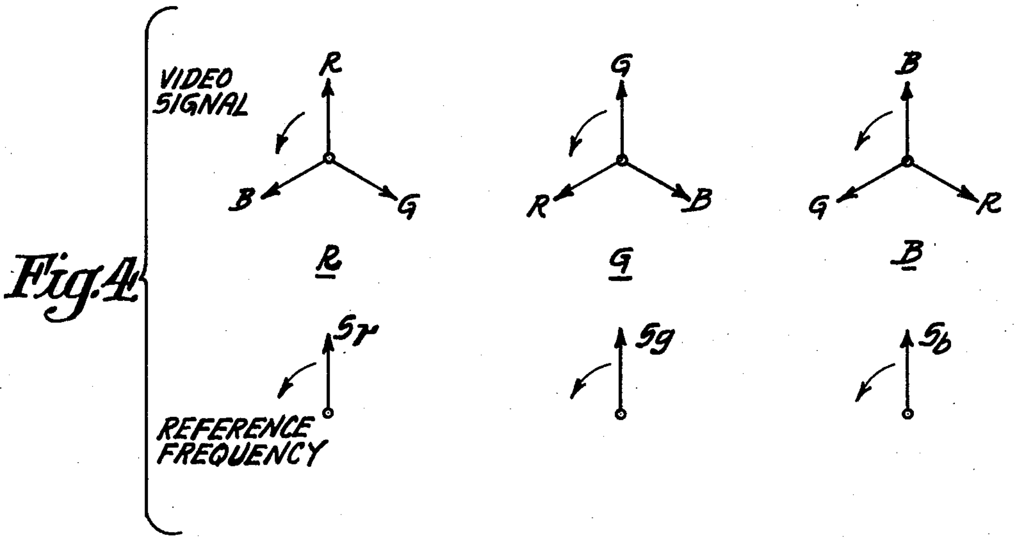

The manner in which the color-representative color carrier wave of the composite video signal derived from the amplifier 12 and the reference frequency wave derived from the generator 25 are impressed in proper time relationship upon the demodulator tubes 57, 58 and 59 may be more clearly understood by having additional reference to the vector diagrams of FIGURE 4. It is seen that, as in the preceeding instance, the delay lines 62 and 63 effect the substantially simultaneous impression of the red, green and blue color-representative carrier wave phases upon the tubes 57, 58 and 59 respectively. Inasmuch as the reference frequency wave is applied directly to the No. 3 grids of all of the tubes without relative phase delay, the S vectors of FIGURE 4 have the same phase in all channels of the demodulator. It may be seen by inspection of this figure, however, that because of the described phase delay in the impression of the video signal-modulated color carrier wave upon these tubes, the reference frequency wave coincides in phase in the tubes 57, 58 and 59 respectively with the red, green and blue color-representative color carrier wave phases as impressed upon these tubes. Therefore, the operation of the demodulator apparatus is substantially the same as in the previously described embodiment of the invention.

Accordingly, it is seen that the present invention provides signal-transfer apparatus which may be benefically employed in a color television system of the type in which a color carrier wave is modulated in phase and amplitude to represent the color of a subject. Furthermore, by means of a system embodying the invention, the transfer apparatus develops output potentials which represent only the desired color information. These results are achieved, irrespective of normal non-uniformity or variations in characteristics such as the transconductance of commerically available electron tubes. It, accordingly, is unnecessary to filter or otherwise remove the direct current and/or the other low frequency components of the video signals before impressing them upon the signal-transfer apparatus in order to avoid the development, in the output circuits thereof, of signals other than the color-representative signal effects.

Also it will be apparent to one skilled in the art that substantially the same apparatus, but with rearranged output and input circuits, may also be used to produce the composite multiplexed signal for a color video signal generator or color television transmitter. In such case the input circuits would be individually adapted to receive three video frequency signals representing three primary colors of the subject and also three phases of the color carrier wave frequency. The output circuits would then be coupled together to develop the composite color video signal.

The nature of the invention may be ascertained from the foregoing description of an illustrative embodiment thereof. Its scope is pointed out in the appended claims.

What is claimed is:

1. In a color television receiver adapted to receive a color carrier wave which is phase-modulated by video signals representing a plurality of colors of a subject, signal-transfer apparatus comprising, a source of substantially constant current, a plurality of substantially similar circuits coupled to said constant current source and dividing said current in accordance with the impedances of said respective circuits, a variable impedance device in each of said circuits having a control terminal, the impedance of each of said devices being variable as a function of the relative phase of two waves of the same frequency impressed upon said control terminal, a source of a reference wave having a frequency equal to said color carrier wave frequency, and means impressing said color carrier wave and said reference wave upon the respective control terminals of said variable impedance devices in such a manner that said reference wave is substantially in phase with different color-representative carrier wave phases at said respective devices, whereby to develop in said respective circuits signal effects corresponding to the relative values of said color-representative video signals independently of any brightness information of said video signals.

2. In a color television receiver adapted to receive a color carrier wave which is phase-modulated by video signals representing a plurality of colors of a subject, signal-transfer apparatus comprising, a plurality of electron tubes, each having a cathode, an anode and at least two grids capable of controlling the electron current flow between said cathode and said anode, means impressing said video signal-modulated color carrier wave upon corresponding ones of said control grids in said respective tubes, means impressing upon corresponding other ones of said control grids in said respective tubes different phases of a reference wave having a frequency equal to said color carrier wave frequency, and a single degenerative circuit coupled to all of said cathodes.

3. In a color television receiver adapted to receive a color carrier wave which is phase-modulated by video signals representing a plurality of colors of a subject, signal-transfer apparatus comprising, an electron tube for each of said color-representative video signals and each having a cathode, an anode and first and second grids capable of controlling the electron current flow between said cathode and said anode, a first input circuit including means providing for the energization of said first grids substantially in-phase, a second input circuit including means providing for the energization of said second grids in relative phases corresponding to the color-representative phases of said color carrier wave, means impressing said video signal-modulated color carrier wave upon one of said input circuits, means impressing upon the other of said input circuits a reference wave having a frequency equal to said color carrier wave frequency, and a single degenerative circuit coupled to all of said cathodes.

4. In a color television receiver adapted to receive a composite video signal which includes a component varying in amplitude and within a predetermined band of frequencies to represent total brightness of a subject and a component comprising a sub-carrier wave having one of said brightness signal frequencies and varying in phase and amplitude to represent the color of said subject, image-reproducing apparatus comprising cathode ray apparatus having an electron gun for each primary color in which an image of said subject is to be reproduced, each of said guns having two electrodes controlling electron beam intensity in accordance with the difference in the potentials impressed respectively thereon, means impressing said composite video signal upon corresponding ones of the beam intensity controlling electrodes of said electron guns, color-controlling apparatus comprising an electron tube for each of said primary image colors, each of said tubes having a cathode, an anode and at least two control grids, means impressing said hue-representative phases of a reference wave having a frequency equal to said sub-carrier wave frequency respectively upon corresponding control grids of said tubes, means impressing said composite video signal upon other corresponding control grids of said tubes, a single circuit having a degenerative action for substantially all frequencies in the range of said composite video signal and coupled in common to the cathodes all of said tubes, and means coupling the anodes of said tubes respectively to the other corresponding ones of the beam intensity-controlling electrodes of said electron guns.

5. In a color television receiver, image-reproducing apparatus as defined in claim 4 wherein, said coupling means includes load circuits connected respectively to the anodes of said tubes, said load circuits being of a character to minimize output voltages for input frequencies at and near said carrier wave frequency.

6. In a color television receiver, image-reproducing apparatus as defined in claim 5 wherein, each of said load circuits includes a load resistor, and means coupled thereto to minimize output voltages developed in said load resistor for frequencies at and near said carrier wave frequency.

7. In a color television receiver adapted to receive a composite video signal which includes a component varying in amplitude and within a predetermined band of frequencies to represent total brightness of a subject and a component comprising a sub-carrier wave having one of said brightness signal frequencies and varying in phase and amplitude to represent the color of said subject, color-controlling apparatus comprising, an electron tube for each hue-representative phase of said sub-carrier wave, each of said tubes having a cathode, an anode and two grids capable of controlling the electron current flow between said cathode and said anode, means impressing said hue-representative phases of a reference wave having a frequency equal to said sub-carrier wave frequency respectively upon corresponding control grids of said tubes, means impressing said composite video signal upon the other control grids of said tubes, individual load circuits coupled respectively to the anodes of said tubes and being of a character to produce minimum voltages in response to input signals at said carrier wave frequency, and appreciable voltages in response to input signals at all other frequencies in the composite video signal range, and a single degenerative circuit coupled in common to the cathodes of all of said tubes and having a relatively high impedance for all frequencies in the range of said composite video signal.

8. In a color television receiver adapted to receive a color carrier wave which is phase-modulated by video signals representing a plurality of colors of a subject, a color carrier wave demodulator comprising, an electron tube for each of said color-representative video signals and each having a cathode, an anode and two grids capable of controlling the electron current flow between said cathode and said anode, means impressing different phases of a reference wave having a frequency equal to said color carrier wave frequency respectively upon corresponding control grids of said tubes, means impressing said video signal-modulated color carrier wave upon the other control grids of said tubes, load circuits coupled respectively to the anodes of said tubes and having impedance characteristics of a character to develop minimum voltages substantially only at said color carrier wave frequency, and a single degenerative circuit coupled in common to the cathodes of all of said tubes and having a relatively high impedance.

9. In a color television receiver adapted to receive a color carrier wave which is phase-modulated by video signals representing a plurality of colors of a subject, a carrier wave demodulator comprising, an electron tube for each of said color-representative video signals and each having a cathode, an anode and first and second grids capable of controlling the electron current flow between said cathode and said anode, a source of a reference wave having a frequency equal to said color carrier wave frequency, a first input circuit including said first control grids coupled together substantially in-phase, a second input circuit including said second control grids coupled together in relative phases corresponding to the color-representative phases of said color carrier wave, means impressing said video signal-modulated carrier wave upon one of said input circuits, means coupling said reference frequency wave source to the other of said input circuits, and means coupling said cathodes together and to a single degenerative circuit having a relatively high impedance throughout the frequency range of said video signals.

10. In a color television receiver, a carrier wave demodulator as defined in claim 9 wherein, said second input circuit includes delay devices coupling said second control grids.

11. In a color television receiver, a carrier wave demodulator as defined in claim 9 wherein, said video signal-modulated wave is impressed upon said first input circuit, and said reference frequency wave source is coupled to said second input circuit.

12. In a color television receiver adapted to receive a color information signal and a reference phase information signal, the combination of, means to shift the phase of said received color information signal to develop a plurality of phase shifted color information signals each having a prescribed and different phase as compared with the phase of the signal as received, means responsive to said reference phase information signal to develop a reference frequency wave of a predetermined phase, a demodulation means, and means to apply said plurality of phase shifted color information signals and said reference frequency wave at the predetermined phase to said demodulator means to demodulate color information relative to the phase of each of said phase shifted color information signals as referred to said predetermined phase.

13. In a color television receiver adapted to receive a color information signal and a reference phase information signal, the combination of, means to shift the phase of said received color information signal to develop a plurality of phase shifted color information signals each having a prescribed and different phase as compared with the phase of the signal as received, and having a predetermined bandwidth, means responsive to said reference phase information signal to develop a reference frequency wave of a predetermined phase, a demodulation means, and means to apply said plurality of phase shifted color information signals and said reference frequency wave at the predetermined phase to said demodulator means to demodulate color information relative to the phase of each of said phase shifted color information signals as referred to said predetermined phase.

References Cited in the file of this patent

UNITED STATES PATENTS

| | | |
|---|---|---|
| 2,423,769 | Goldsmith | July 8, 1947 |
| 2,563,406 | Goldberg | Aug. 7, 1951 |
| 2,587,074 | Sziklai | Feb. 26, 1952 |
| 2,632,046 | Goldberg | Mar. 17, 1953 |
| 2,644,855 | Bradley | July 7, 1953 |
| 2,744,155 | Kihn | May 1, 1956 |